Patented Apr. 7, 1931

1,799,238

UNITED STATES PATENT OFFICE

AUGUST LEIB, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

RADIO DIRECTION FINDING MEANS FOR AIRPLANES

Application filed March 12, 1927, Serial No. 174,764, and in Germany March 20, 1926.

This is an improvement on U. S. application #120,220 filed July 2, 1926, which discloses a method for airplane direction finding by means of wireless devices thus greatly simplifying aerial navigation because the positions of the goniometer coil or loop or the results of the direction finding are constantly imparted to the pilot from the direction finder. In order to dispense with a special operator for the goniometer, an automatic arrangement has been disclosed in the said application comprising means adapted to rotate the goniometer coil by the aid of a driving mechanism which co-acts with a synchronously operating indicating device. In the form of construction of the said automatic device therein disclosed, the driving mechanism for the coil is subject to control by the current of the direction finder so that the coil is set at rest after the minimum position has been reached.

The object of the present invention is to improve and simplify the automatic direction finding means whereby it is possible for the pilot to continuously read the results of the direction finding similarly as in a measuring instrument without that the pilot's duties be increased by any manipulation of the direction finder.

To attain this object, the goniometer coil is kept in continuous motion by an entirely independent driving mechanism, and also an element of the indicator device is kept in synchronous motion with the movement of the direction finder coil, while the indication is effected in dependence upon the energy of the direction finder receiver. Thus if a potential indicator device such as a helium tube or the like, is combined with the moved element of the indicator device, which, in the presence of a definite position of the goniometer coil is caused to flash or to go out every time when, for instance maximum or minimum energy volume is received, said indicator shows on a conveniently arranged fixed scale the goniometer positions of the coil or the results of the direction finding or the course of the craft.

The accompanying drawings show diagrammatically two forms of construction by way of example of the basic idea of the invention.

Figure 1:
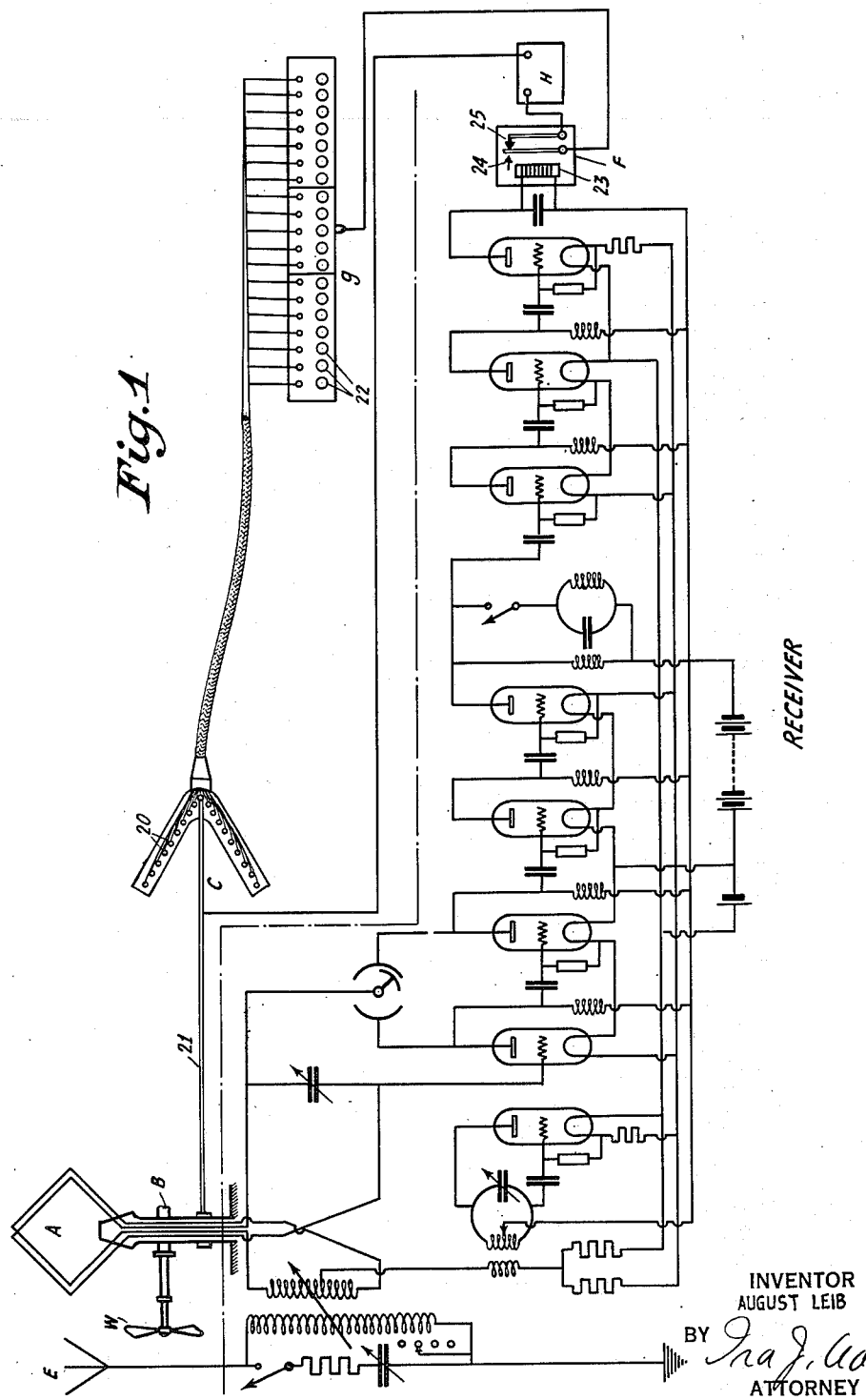
Figure 2:
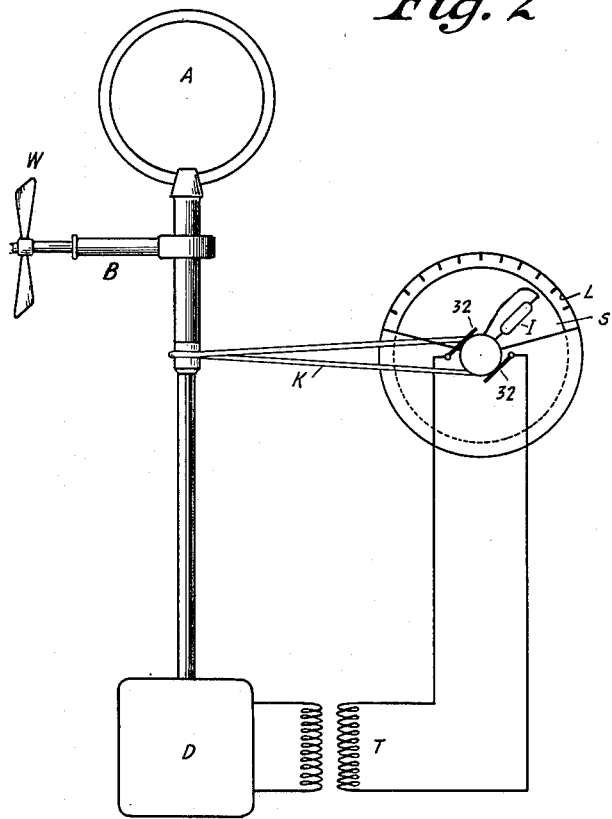

Fig. 1 shows one embodiment of the invention in which a series of glow lamps is used as the indicating device; and, Fig. 2 shows a simpler arrangement in which a helium tube is used as the indicating device.

Referring to Fig. 1, A is the goniometer coil which is kept in constant rotation by means of a driving device existent on the aircraft. The drive is effected, for instance, by the agency of a small propeller W kept in motion by the motion of the aircraft. In this manner, electrical disturbances are largely avoided, while, on the other hand, so far as the aims and purposes of the invention are concerned, it is immaterial whether the rate of movement of the goniometer coil is regular and uniform or not. The motion may be rotational, though it is a more suitable plan to make it reciprocating inside a sector of say 90 degrees in or about the travel of the craft. In this case, the drive B would comprise a reversing gear between the propeller W and the coil axis. From the coil axis there is further moved over a row of contacts 20 the switch lever 21 of a multi-step switch or controller C in synchronism with the movement of the coil A; each of contacts 20 is connected with a respective glow lamp 22 mounted on a panel g. The circuit of said panel, and the switch C is closed by way of a relay F and a battery H. The relay F is subject to control by the goniometer receiver D. E denotes an auxiliary antenna which has the object of making the minimum volume more distinct as is well known in the art. If during the turning of the coil A, energy is coming in relay F keeps the circuit of the battery H interrupted as follows:—

The incoming energy energizes magnet 23 which in turn draws armature 24 away from contact 25 thus breaking the circuit thru the battery H, the lamps 22 and the controller device C. When, however, the volume of current is a minimum or zero the magnet is denergized thus allowing armature 24 to return to position shown in Fig. 1 thereby closing the circuit thru 25, H, and the lamp 22 which happens to be in circuit at that time due to the position of 21. Blade 24 is returned to the position of Fig. 1 by means of a spring which is not shown. Fig. 2, illustrates a simpler embodiment of the invention.

From the axis of the goniometer coil A (which is also moved by a driving mechanism B), there is moved at the same time, say, by a cord or belt drive K a disc S which at a convenient point has an indicator device such as for instance a helium tube I. The said disc is moved with reference to a stationary scale L. The said helium tube is fed thru the agency of sliding contacts 32 from a transformer T which is connected with the receiver D. The transformer T should be connected with the plate circuit of the last stage amplifier tube of the receiver so as to insure a sufficient supply potential for the luminous indicator tube. The helium tube I is subject to potential as long as energy is received thru A, but the tube I will go out for a brief instant every time that the goniometer coil during its motion passes thru the minimum position whereby the determinations of the direction finder are directly shown by means of the chart on scale L.

Having described my invention, I claim:—

1. In radio apparatus to be used on moving craft, the combination of a motor, a loop rotated continuously by said motor, a signal indicating device rotated by said motor in synchronism with said loop and radio receiving apparatus operatively interposed between said loop and said signal indicating device.

2. In radio direction finding apparatus the combination of a rotatable loop and a rotatable disc, a wind driven motor for rotating said loop and said disc synchronously at a high rate of speed, a stationary scale surrounding the periphery of said rotatable disc, an elongated glow tube having its axis mounted on a radius of said rotatable disc, a radio receiver including an amplifier connected to said loop, and means including brushes connected to the output circuit of said receiver and rotatable rings carried by said disc for connecting the output of said receiver to the luminous tube.

3. In radiant energy direction finding apparatus, the combination of a rotatable directional aerial, a rotatable position indicating device, means for rotating said aerial and said indicating device continuously, signal responsive means on said indicating device, and a receiver connected on the one hand with said directional aerial and on the other hand with said signal responsive means.

AUGUST LEIB.